(12) United States Patent
Minami et al.

(10) Patent No.: US 7,451,060 B2
(45) Date of Patent: Nov. 11, 2008

(54) METHOD OF PRODUCING AERIAL PHOTOGRAPH DATA

(75) Inventors: Yoshihiko Minami, Tokyo (JP); Yukio Akamatsu, Tokyo (JP); Hiroshi Takeda, Tokyo (JP)

(73) Assignee: Kokusai Kogyo Co., Ltd, Tokyo (JP)

( * ) Notice: Subject to any disclaimer, the term of this patent is extended or adjusted under 35 U.S.C. 154(b) by 162 days.

(21) Appl. No.: 11/530,114

(22) Filed: Sep. 8, 2006

(65) Prior Publication Data

US 2008/0065349 A1    Mar. 13, 2008

(30) Foreign Application Priority Data

Sep. 6, 2006    (JP)    ............................. 2006-272268

(51) Int. Cl.
*G01B 11/14*    (2006.01)
(52) U.S. Cl. ...................... 702/158; 382/284
(58) Field of Classification Search ................. 702/150, 702/151, 155, 158; 382/283, 284; 345/420, 345/473
See application file for complete search history.

(56) References Cited

U.S. PATENT DOCUMENTS

| | | | | | |
|---|---|---|---|---|---|
| 5,999,185 | A | * | 12/1999 | Kato et al. | ................... 345/420 |
| 2007/0010965 | A1 | * | 1/2007 | Malchi et al. | ............... 702/151 |
| 2008/0063299 | A1 | * | 3/2008 | Murai et al. | ................ 382/284 |

* cited by examiner

*Primary Examiner*—Bryan Bui
(74) *Attorney, Agent, or Firm*—Lucas & Mercanti, LLP

(57) ABSTRACT

A method of producing aerial photograph data is provided which is capable of positively utilizing stored photograph data and an image of a desired object included in a photographed image. The method includes a step of determining a distance between a position of a virtual photographic principal point (virtual photographic principal point position) obtained by the use of spatial position information of a target point and spatial direction of a view vector and a position of an actual photographic principal point (actual photographic principal point position) of each of a plurality of aerial photographs to automatically select a specific aerial photograph, and a step of extracting, from the specific aerial photograph, a selected image having the target point arranged at a predetermined position therein.

10 Claims, 3 Drawing Sheets

METHOD OF PRODUCING AERIAL PHOTOGRAPH DATA

Priority of Japanese Patent Application JP2006/272268 filed Sep. 6, 2006, is claimed and the same is incorporated herein by reference.

BACKGROUND OF THE INVENTION

1. Field of the Invention

The present invention relates to a method of producing aerial photograph data and the data obtained by such method. In particular, the present invention relates to a method of producing aerial photograph data which enable novel utilizations of aerial photographs. The present invention also relates to aerial photograph data which can be utilized in various ways.

2. Description of the Related Art

Aerial photograph images have conventionally been utilized in various ways. For example, they are utilized in photogrammetry for topographic mapping production, industrial surveying, cultural property surveying, natural disaster surveying and so on. When utilized for such application, the aerial photograph images are sometimes produced as stereo images. The stereo images are obtained by generating pair links to assign a certain relationship to the aerial photograph images and searching the pair links. This method is described for example in Japanese Laid-Open Patent Publication Nos. 2001-28049, 2002-5659, 2003-32364, and 2006-018549. A special method of processing the aerial photograph images for easy observation is described in Japanese Laid-Open Patent Publication No. 2005-156514.

The aerial photography (aerophotography) for obtaining the aerial photograph image is typically conducted such that the photographic images partially overlap both lengthwise and crosswise at a endlap ratio and a sidelap ratio. Japanese Laid-Open Patent Publication No. 2005-156514 mentioned above also describes the utilization of such overlapping images.

The conventional methods described above however have various problems. For instance, it takes time to access desired images. A large amount of labor and time are also required to prepare the desired images. Furthermore, it is not easy to obtain the desired image. There is a demand for improvement for solving these problems. For example, when the overlapping of aerial photographs as described in Japanese Laid-Open Patent Publication No. 2005-156514 above is utilized to observe a desired place from a desired direction, it takes time to generate a required data set. When stereo images are to be obtained, pair links need be produced in advance, and then access is performed by using the pair link information. Therefore, considerable skill or time is required to perform such access.

SUMMARY OF THE INVENTION

It is therefore an object of the present Invention to solve the problems of the conventional methods. A first aspect of the present invention relates to a method of producing aerial photograph data, which is found to be very useful and is claimed as Claim 1, includes the steps of: determining a distance between a position of a virtual photographic principal point (virtual photographic principal point position) obtained by the use of spatial position information of a target point and a spatial direction of a view vector and a position of an actual photographic principal point (actual photographic principal point position) of each of a plurality of aerial photographs to automatically select a specific aerial photograph; and extracting, from the specific aerial photograph, a selected image having the target point arranged at a predetermined position in the selected image.

The method of the present invention is characterized by its simplicity. Specifically, the user is allowed to obtain or view what he/she wants to obtain or view simply by two major operations: inputting spatial position information of a position and altitude of an object of survey or observation to determine a target point (a point of the object to be particularly observed); and inputting a spatial direction of the view vector to indicate the direction in which the target point is to be observed. The spatial direction, consisting of a direction in a horizontal plane and a direction in a vertical plane, may be input precisely, or may be input by selecting one from rough classifications of directions for the purpose of simplifying the procedure.

For example, the direction in the vertical plane may be input such as 45 degrees. Alternatively, classifications of high, medium, and low altitudes may be predetermined while classifying the direction of the 45 degrees in the low altitudes, and the low altitudes may be selected to input the direction in the vertical plane. The direction in the horizontal plane may be input by entering a specific azimuth, or instead by selecting one from eight different azimuths of north, east, south, west, north east, northwest, southeast, and southwest.

According to the present invention, a virtual photographic principal point position or a range of virtual photographic principal point positions desirable for viewing the target point can be obtained by inputting or selecting spatial position information of the target point and spatial direction of the view vector. To do so, in general, an intersection point of the vector and the plane at the height of an actual photographing position (an example of the reference plane height) is utilized. However, if there is a special purpose, the plane height according to the purpose may be used. An average value of the altitudes of the photographing positions can be used as the reference plane height.

Once the virtual photographic principal point is determined as described above, then the relationship between the actual photographic principal point position and the virtual photographing position is examined in order to select an aerial photograph containing the target point (having the spatial position information contained within the photographing range), for example, from a plurality of aerial photographs stored in database. For example, an aerial photograph having a shortest distance between the actual photographic principal point position and the virtual photographic principal point position is selected.

A selected image is formed from the aerial photograph thus selected. When the target point is to be arranged in the middle of the selected image, for example, the selected image is formed by cutting out a desired range, for example a maximum range that can be cut out of the aerial photograph when the target point is arranged in the middle. When the selected image is displayed, it may be preferable for easier viewing, depending on the spatial direction, to rotate the displayed image (for example by 180 degrees) to turn it upside down, or to rotate by an appropriate angle (for example by 100 degrees) especially when the image containing the target point extends downward. Therefore, embodiments of the present invention include displaying an image which is rotated as desired.

A second aspect of present invention relates to the method of producing aerial photograph data according to the first aspect, wherein the spatial position information includes two-dimensional position information and altitude information of the target point, the spatial direction including a two-dimensional direction and a depression angle direction of the view vector, and the virtual photographic principal point position being obtained based on the altitude, the depression angle direction, and the height of a reference plane to photograph the aerial photograph, and this method is claimed as Claim 2.

A third aspect of the present invention relates to the method of producing aerial photograph data according to the first and second aspects above, further including the step of selecting a specific aerial photograph having the shortest distance between the virtual photographic principal point position and the actual photographic principal point position, and this method is claimed as Claim 3.

A fourth aspect of the invention relates to the method of producing aerial photograph data according to any one of the first, second and third aspects, wherein the target point is placed in the middle of the selected image. This method is claimed as Claim 4.

The present invention is applicable to various applications. A fifth aspect of the invention relates to the method of producing aerial photograph data according to any one of the first to fourth aspects above, further including the steps of: defining the actual photographic principal point position (first actual photographic principal point position) of the specific aerial photograph (first specific aerial photograph) and a second actual photographic principal point position on a straight line or a substantially straight line specified on a horizontal plane or a substantially horizontal plane; selecting a second specific aerial photograph (second specific aerial photograph) having the second actual photographic principal point position; and extracting, in addition to the selected image (first selected image), a second selected image having the target point placed at the predetermined position in the second selected image from the second specific aerial photograph. This method is claimed as Claim 5.

A sixth aspect of the present invention relates to the method of producing aerial photograph data according to the fifth aspect above, further including a step of inputting a direction and length of the straight line, wherein using the virtual photographing position that is obtained when a perpendicular line to the straight line is matched or substantially matched with the spatial direction at the midpoint of a line segment having the input length, one end of the straight line is used to select the first actual photographic principal point position while the other end of the straight line is used to select the second actual photographic principal point position, based on the length of the line segment. This method is claimed as Claim 6.

A seventh aspect of the invention relates to the method of producing aerial photograph data according to any one of the first to fourth aspects above, including an acquisition step in which distances are compared between actual photographic principal point positions of the plurality of aerial photographs and a virtual photographic principal point position (second virtual photographic principal point position) that is different from the virtual photographic principal point position (first virtual photographic principal point position) and is obtained based on a spatial direction (second spatial direction) that is the same as or different from the spatial direction (first spatial direction) and spatial position information of a target point (second target point) that is different from the target point (first target point) to automatically select a second specific aerial photograph having the second actual photographic principal point position, and in addition to the first selected image a second selected image including the second target point is extracted from the second specific aerial photograph, wherein, when the second target point is defined or the size of the second selected image and the arrangement of the images are determined such that the first selected image is partially overlapped with the second selected image, and the first selected image and the second selected image are arranged adjacent to or close to each other, the spatial direction of the first target point in the first selected image becomes parallel or substantially parallel with the spatial direction of the second target point in the second selected image, and the first selected image and the second selected image hold the continuity with each other. This method is claimed as Claim 7.

An eighth aspect of the invention relates to the method of producing aerial photograph data according to the seventh aspect above, including successive steps of repeating the acquisition step for third and subsequent specific aerial photographs of third and subsequent actual photographic principal point positions obtained based on third and subsequent target points and third and subsequent virtual photographic principal point positions to produce third and subsequent selected images including the third and subsequent target points. This method is claimed as Claim 8.

A ninth aspect of the present invention relates to an aerial photograph data wherein a plurality of selected images are arranged in the sequence corresponding to the sequence of photographing, the selected images being obtained by a method of producing aerial photograph data including: a step of determining a distance between a position of a virtual photographic principal point (virtual photographic principal point position) obtained by the use of spatial position information of a target point and a spatial direction of a view vector and a position of an actual photographic principal point (actual photographic principal point position) of each of a plurality of aerial photographs to automatically select a specific aerial photograph; a step of extracting, from the specific aerial photograph, a selected image having the target point arranged at a predetermined position therein; an acquisition step in which, distances are compared between actual photographic principal point positions of the plurality of aerial photographs and a virtual photographic principal point position (second virtual photographic principal point position) that is different from the virtual photographic principal point position (first virtual photographic principal point position) and is obtained based on a spatial direction (second spatial direction) that is the same as or different from the spatial direction (first spatial direction) and spatial position information of a target point (second target point) that is different from the target point (first target point) to automatically select a second specific aerial photograph having the second actual photographic principal point position, and in addition to the first selected image a second selected image including the second target point is extracted from the second specific aerial photograph such that, when the second target point is defined or the size of the second selected image and the arrangement of the images are determined such that the first selected image is partially overlapped with the second selected image, and the first selected image and the second selected image are arranged adjacent to or close to each other, the spatial direction of the first target point in the first selected image becomes parallel or substantially parallel with the spatial direction of the second target point in the second selected image, and the first selected image and the second selected image hold the continuity with each other; and successive steps of repeating the acquisition step for third and subsequent specific aerial photographs of third and subsequent actual photographic principal point positions obtained based on third and subsequent target points and third and subsequent virtual photographic principal point positions to produce third and subsequent selected images including the third and subsequent target points. This data set is claimed as Claim 9.

A tenth aspect of the present invention relates to an aerial photograph data set wherein aerial photograph data of a first selected image and aerial photograph data of a second selected image are combined to produce a stereo data set, the first and second selected images being obtained by a method of producing aerial photograph data including: a step of determining a distance between a position of a virtual photographic principal point (virtual photographic principal point position) obtained by the use of spatial position information of a target point and a spatial direction of a view vector and a position of an actual photographic principal point (actual photographic principal point position) of each of a plurality of aerial photographs to automatically select a specific aerial photograph; a step of extracting, from the specific aerial photograph, a selected image having the target point arranged at a predetermined position therein; a step of selecting a second specific aerial photograph (second specific aerial photographs) including the actual photographic principal point position of the first specific aerial photograph (first actual photographic principal point position) and having a second actual photographic principal point position located on a straight line or substantially straight line specified on a horizontal plane, and extracting a second selected image having the target point arranged at the predetermined position in the second selected image from the second specific aerial photograph; and a step of inputting a direction and length of the straight line, wherein using the virtual photographing position that is obtained when a perpendicular line to the straight line is matched or substantially matched with the spatial direction at the midpoint of a line segment having the input length, one end of the straight line is used to select the first actual photographic principal point position while the other end of the straight line is used to select the second actual photographic principal point position, based on the length of the line segment. This data set is claimed as Claim 10.

The present invention having features as described above provides an advantage that a desired image can be obtained by simple operations. Additionally, the present invention is applicable to various applications, where an image can be easily obtained at a necessary target point from a necessary angle for plotting or inspection, and desired stereo images also can be obtained easily. The present invention further provides an advantage that successive images can be obtained at a desired angle along a roadway, for example. Thus, the present invention is advantageously applicable to various usages. Other objects and advantages of the invention will be appreciated in more detail by reference to the following description and appended drawings.

DESCRIPTION OF THE PREFERRED EMBODIMENTS

Figure 1:
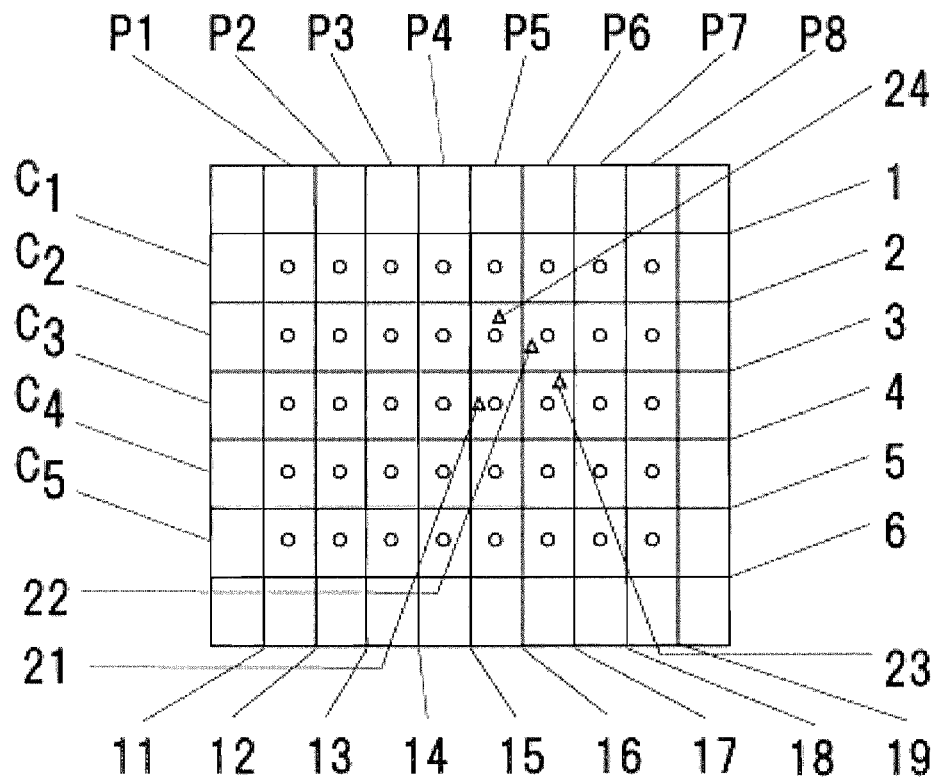
FIG. 1 is a conceptual diagram illustrating the positions of photographic principal points according to the present invention.

According to the present invention, in order to view a certain target point from a certain angle, for example, spatial position information of the target point (for example, the degree of north latitude, the degree of east longitude, and the altitude of the target point) is entered. Additionally, information of a spatial direction of a view vector (for example, in order to view the target point from the northeast direction, the information of "northeast", and in order to view the target point at a depression angle of about 40 degrees, the information of "40 degrees") is entered. Using for example an average reference altitude value obtained by averaging reference altitudes, an intersection point is obtained between a straight line obtained by extending the entered spatial direction from the target point and a horizontal plane located at the average reference altitude value, and the spatial position thereof (defined as the virtual photographic principal point position at the entered degrees of north latitude, degrees of east longitude, and altitude) is compared with respective photographed spatial positions of an aggregate of a multiplicity of photographed aerial photographs (positions and altitudes of actual photographic principal points). Based on the comparison results, an aerial photograph which has a minimum distance or a plurality of aerial photographs which have a distance within a specific range, for example, are automatically selected from the aggregate of photographed aerial photographs. When a plurality of aerial photographs are selected, a thumbnail display method is then employed to display the plurality of specific aerial photographs so that one selected image is produced from the selected specific aerial photographs, or selected images are produced respectively from the plurality of specific aerial photographs.

The image of the target point of the selected aerial photograph is arranged at a specific position, for example in the middle of a selected image available, and an image having predetermined dimensions is cut out of the aerial photograph to generate the selected image. It is also possible to insert selection means in the respective steps described above so that the selection is conducted in each step. In this case, preferably, a set value which is most frequently used is preset so that the selection means is activated if necessary. The selection means is employed for example when the reference altitude is selected based on a maximum value or a minimum value instead of the average value thereof. When a desired set value is to be input as the reference altitude, input means may be provided as the selection means. It is also possible to provide, in each step, selection means for selecting arrangement of the target point in the image, or selection means for setting the dimensions of the selected image.

For example, when using selection means for selecting the position of the target point in the selected image, the selection means may select the lower left corner or lower right corner of the image instead of the center thereof. It is also possible to include a step to select a distance between the virtual photographing position and the actual photographing position, or a difference between horizontal distance and altitude. In this manner, it is also possible to provide a selection step in each step. However, in either case, it is desirable, as described above, to preset a most frequently used set value in each step so that the selection step is used as required. This provides an advantage to simplify the data entry step.

The selected image selected in the manner described above can be displayed in a size as required at a position as required whenever necessary. For example, when an image having a minimum distance is to be selected, and there are a plurality of images having a same distance or a plurality of images are provided so that those included in a certain range of the minimum distance that is preset are utilized, the plurality of images may be displayed as the selected images to allow the user to select a desired one. Alternatively, when altitudes are classified, for example, it is also possible to select and display an image having an altitude angle closest to the desired one from a plurality of images, while holding the other images in a subsequently selectable state with the display of a message of that effect. When automatic selection of an image is not possible or manual selection is to be employed, an appropriate conventional display and selection method may be used. For example, all the images may be thumbnail displayed to allow the user to select a desired one, or some of the images may be displayed with the display of a message telling that there are still other images selectable.

In an embodiment of the present invention, various applications are made possible by obtaining a plurality of selected images according to a certain principle. For example, when it is desired to obtain a stereo image for the purpose of plotting or observation, and to observe a certain target point in a stereo image at a certain depression angle that is conventionally impossible, two points are selected on a straight line or a substantially straight line on a horizontal plane or a substantially horizontal plane at the reference altitude in the step of obtaining selected images as described above. One aerial photograph each is selected from the aerial photographs of the actual photographing positions close to the selected points, and two selected images containing the target point are cut out therefrom, respectively. In this manner, an aerial photograph data set can be produced which provides a stereo image enabling observation in stereo.

In order to observe a stereo image obtained by viewing a certain target point at a certain depression angle in a certain direction, spatial position information of the target point and a spatial direction of the view vector are entered. At the same time, when it is desired to obtain a stereo image data set to view the target point in stereo condition that is similar to natural three-dimensional feeling, a length value that is close to the distance between the eyes is additionally entered as the length of the straight line, or the user is prompted to select one from among classifications of feelings: intense stereo feeling, natural stereo feeling, and low stereo felling (the length of the straight line is decreased in this order). In case of the selection from the classifications, the length of the representative line segment is used, whereas when the selection from the classifications is not employed, the entered length of the line segment is used, and the midpoint of the entered line segment or the representative line segment of the selected classification is placed at the intersection point defined by the straight line extended from the spatial position of the target point intersecting with the average photographing altitude of the aerial photographs when matched with the spatial direction of the view vector. The line segment having the entered length of the straight line is arranged so as to intersect orthogonally with the extended straight line and such that the line segment is included in a horizontal plane or a substantially horizontal plane. Then, as described above, one photograph each which is located at a close distance to each of the opposite ends of the line segment is selected from the aerial photographs of the photographing position.

The selected aerial photographs are arranged such that the target point is positioned in the middle or at a designated position as required. A stereo image set can be formed of two selected images obtained by cutting out images having a maximum or desired size within a common range from the two selected aerial photographs, respectively.

The stereo image set thus obtained is displayed on a display device, for example. A stereo image can be obtained by observing the displayed images having different colors from each other through a filter having a complementary color. Alternatively, a stereo image also can be obtained by arranging the two displayed images at a proper distance from each other at proper positions and viewing these images with both eyes, respectively. Still alternatively, a stereo image can be obtained by combining the display of the two images with an arrangement of lenticular lens. In a typical plotting step, a liquid crystal shutter method is utilized in which a stereo image is obtained by alternately displaying the right and left images on a display screen in synchronization with the alternate opening/closing of liquid crystal shutters placed between the both eyes and the display screen. Such method for obtaining a stereo image may be selected from conventional stereo image observation methods according to a purpose of use. For example, an inexpensive method is preferred when the stereo image is to be viewed by a general user on an Internet terminal.

Viewing in stereo the stereo image set according to the present invention makes it possible to obtain a video image at an angle which cannot be obtained from a conventional stereo image set. Thus, the present invention not only simplifies the operation but also improves the usefulness. For example, when using the stereo image set according to the present invention in a plotting step, desired spatial directions can be selected freely, and the plotting accuracy can be improved by means of a video image view at a viewing angle which is conventionally impossible. Additionally, since the intensity of stereo feeling can be selected for example by means of the input of a line segment length, the precision and the accuracy can be improved further.

It is also possible, according to the present invention, to obtain successive images or non-successive images of a plurality of target points along a certain roadway as viewed in a certain spatial direction. In order to obtain the successive images, a curved line or straight line of a certain roadway or a certain river is selected and a target point on the opposite sides or one side thereof is entered. A plurality of target points are then automatically selected successively along the curved line or straight line, at intervals of a fixed or substantially fixed distance, the plurality of target points being located on the same side of the curved line or straight line at positions apart from the curved line or straight line by a same or substantially same distance and at a same or substantially same height. Using the spatial positions and the spatial directions of the target points which are selected using the spatial direction of the entered target point, the azimuth is corrected such that the spatial direction becomes orthogonal to the curved line or straight line according to the positions of the target points. The intersection point with the average altitude plane of the aerial photographs is found in a similar manner to the other embodiment, so that the position of the virtual photographic principal point is defined. Examining the relationship between the virtual photographic principal points and the actual photographic principal points, an aerial photograph for example having a shortest distance therebetween is selected for each of the target points. In this manner, aerial photographs at the positions of the actual photographic principal points corresponding to the target points are selected, respectively.

In a similar manner to the other embodiment, selected images are cut out of the selected spatial photographs such that the adjacent images partially overlap when arranged according to the arrangement of the target points. The selected images thus produced are successive images along the curved line or straight line, and thus a data set of aerial photograph images can be obtained. The aerial photograph image data set thus obtained relates to image data of the periphery along a certain roadway or the like which is obtained by viewing the target points from a certain substantially fixed angle. Thus, according to the present invention, an image data set from a view point that is conventionally impossible can be obtained.

In order to display the successive aerial photograph image data set, the successive aerial photographs may be arranged and displayed successively in the form a straight line, or may be arranged and displayed along the roadway as they originally are while displaying the roadway on the screen. In either way of the display above, the aerial photographs may be displayed all at once, or may be displayed one by one as flash images. Thus, according to the present invention, images from desired spatial directions can be obtained and displayed, whereby it is made possible in a plotting step, inspection step or the like to observe a spot which cannot be viewed by conventional techniques. This further improves the accuracy and precision.

Instead of obtaining successive selected images along the curved line or straight line as described above, it is also possible to obtain selected images by focusing attention only to necessary target points. In this case, spatial position information of the respective necessary target points is entered, and then a spatial direction of the view point vector is entered, whereby the spatial direction is converted into a spatial direction of the azimuth at each of the target points. By repeating the step of obtaining one desired selected image, selected images including the respective target points can be obtained. These selected images can be displayed in the same manner as the successive images. For example, non-successive images may be more desirable when the images are used by a real estate agent or the like to explain to a customer the conditions of properties on sale along the roadway.

In any embodiment of the present invention, zooming display is made possible by storing image data of different sizes within a range where cutting out of the selected images is possible. This enables an observer to obtain more impressive images and to obtain an enlarged display by zooming only a necessary portion of the image. Accordingly, the range of application of the present invention can be increased.

The present invention will be described more specifically with reference to the accompanying drawings. FIG. 1 is a conceptual diagram illustrating photographic principal point positions of aerial photographs. There are shown in FIG. 1 rows from C1 to C5 and columns from P1 to P8. These rows and columns are divided by straight lines 1 to 6 and straight lines 11 to 19, respectively. The diagram illustrates how an aircraft photographed aerial photographs at the positions indicated by the circles by repeating, according to a flight plan, the cycle of flying from south to north (in the direction from the position of the straight line 6 to the position of the straight line 1) and making a U-turn to fly from north to south (in the direction from the straight line 1 to the straight line 6), while gradually shifting the position from east to west (in the direction from the position of the straight line 11 to the position pf the straight line 19). The positions indicated by the circles are part of the positions of all the photographic principal points to be photographed according to a photographing plan. In this diagram, the positions are represented two-dimensionally in latitudes and longitudes. In other words, the diagram can be referred to as a plan view of the ground as viewed from the sky.

The photographing plan is established such that the overlapping ratios in height and width (the endlap ratio and the sidelap ratio) of the photographing area are both 80%. Accordingly, five sections in row and five sections in column, 25 sections in total form one aerial photograph displayed. For example, the area indicated by the rows from C1 to C5 and the columns from P1 to P5 represents one aerial photograph. A multiplicity of aerial photographs are obtained in this manner while recording the conditions when they are photographed. Specifically, the actual photographing positions are measured by equipment such as GPS to record the positions, altitudes, and the three-dimensional angles of the photographing directions. These photographing conditions are used to correct the photographing position or the photographing area. Such correction is typically implemented by heretofore known back projection, which is for example described in detail in the aforementioned Japanese Laid-Open Patent Publication No. 2005-156514.

A description will be made of the process of inputting the spatial position and the spatial direction of a view vector of a target point to be viewed, selecting desired aerial photographs from among a multiplicity of aerial photographs based on the input data, and generating a selected image from the selected aerial photographs. The entered position of the target point is assumed to be 21 in FIG. 1.

Figure 2:
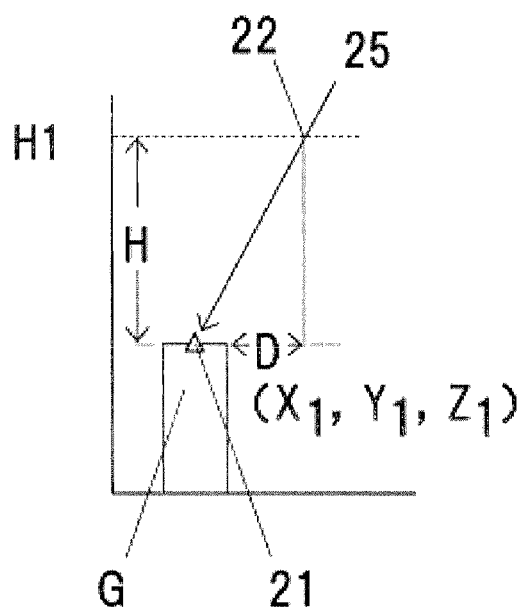
FIG. 2 shows an example of depression angle in a spatial direction of a view vector according to the present invention.

FIG. 2 is a diagram illustrating a depression angle. As seen from FIG. 2, the position of the target point of a target object G containing the target point 21 is indicated by X and Y and the altitude is indicated by Z. Thus, the spatial position of the target point 21 is represented by the X, Y, and Z coordinates. H1 denotes a reference plane height, or a flying altitude according to the flight plan. In practice, the reference plane height is preferably defined by averaging actual flying altitudes. The reference numeral 25 denotes spatial directions of the view vector, and a depression angle is angle θ represented by $\tan \theta = (H1-Z)/D$. D denotes a horizontal distance between the position of the target point and the position (intersection point) 22 where the view vector intersects with the reference plane.

The intersection point 22 represents a virtual photographic principal point position 22, which is also shown in FIG. 1. The direction in which the target point 21 is viewed from the virtual photographic principal point position 21 represents the azimuth of the spatial direction (substantially southwest direction in FIG. 1). In this manner, the azimuth and depression angle of the view vector are used to obtain a virtual photographic principal point position 22 from the target point 21, and a photographic principal point at the row C2 and the column P6 that is closest to the virtual photographic principal point position 22 for example is selected as an aerial photograph required.

Figure 3:
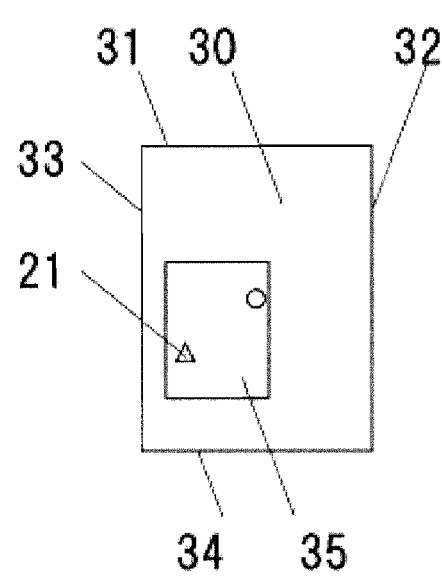
FIG. 3 is a conceptual diagram of a selected image according to the present invention.

The aerial photograph thus selected forms one photographic image, being located in the range from the row above the row C1 to the row C4 and from the column P4 to the column P8, in other words in the area surrounded by the uppermost non-numbered horizontal line, the line 5, the line 14, and the line 19. FIG. 3 shows such aerial photograph 30 surrounded by line segments 31 to 34. FIG. 3 is a diagram illustrating the selected image.

When the user inputs a message that the target point should be placed in the lower left portion of an obtained image is input (the target point will be placed in the middle of the obtained image in the absence of input from the user), a selected image 35 having the target point 21 placed in the lower left portion is obtained. The circle in the middle represents the position of the photographic principal point. In FIG. 3, the size range of the selected image 35 is determined based on the base that can be shifted until reaching a line segment 34 or the left side that can be shifted until reaching a line segment 33, whichever is shorter. Therefore, the size of the selected image 35 can be made selectable according to necessity, or can be determined to a maximum size. Further, the selected image 35 can be zoom displayed as well.

Figure 4:
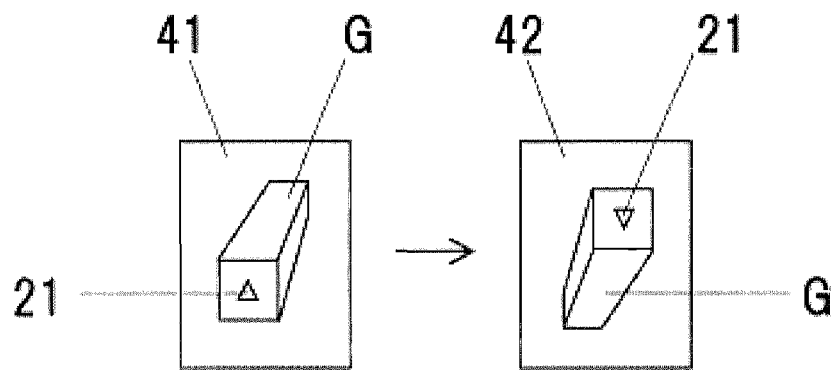
FIG. 4 is shows an example of display according to the present invention.

In this manner, it is made possible to observe a desired target point in any desired spatial direction of the view vector, leading to improvement of the accuracy and precision of the conventional plotting, verification, and other processes. FIG. 4 shows an example of a target object G thus obtained. The reference numeral 21 denotes a target point, and the reference numeral 41 denotes an image obtained. This image 41 is rotated for example by 180 degrees to obtain an image 42 which is displayed in such a manner that the target point 21 can be observed together with the target object G. If it is easier to observe the target object G in the condition where it is inclined at a smaller angle, for example, where it looks like standing perpendicular to the ground, the angle of rotation may be set smaller than 180 degrees, set to 160 or 100 degrees for example. Thus, the display can be selected appropriately.

Figure 5:
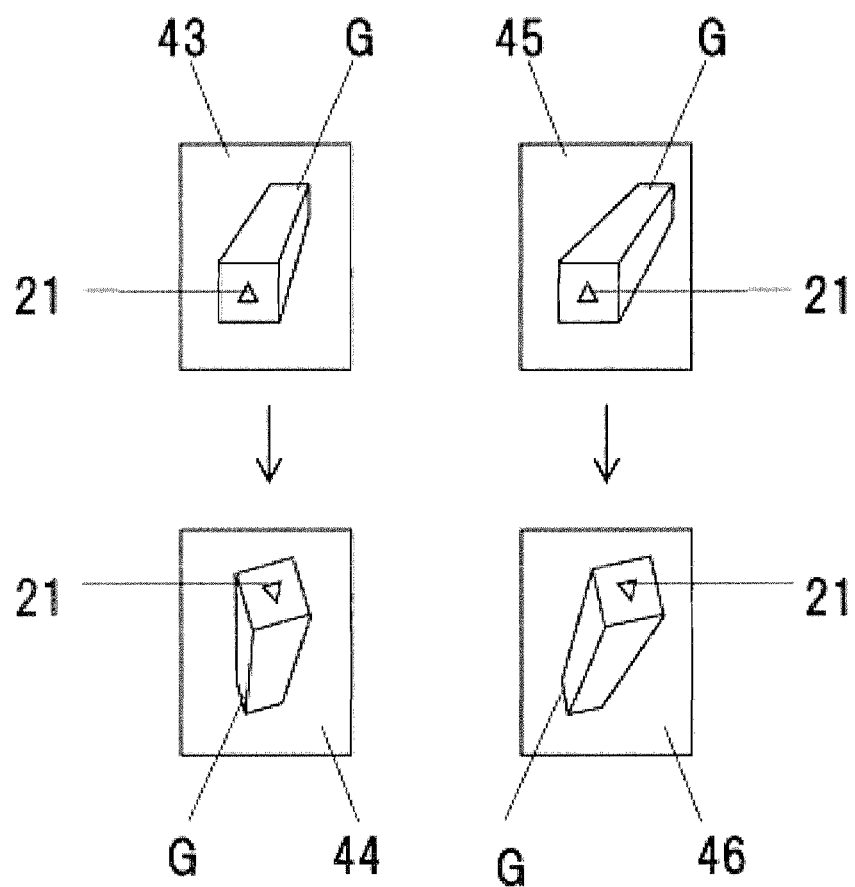
FIG. 5 shows an example of stereo images according to another embodiment of the present invention.

FIG. 5 shows an example of application as a stereo image. The object G and the target point 21 shown in obtained images 43 and 45 are rectified to produce images 44 and 46. These images 44 and 46 are displayed, while displaying the image 44 in blue and displaying the image 46 in red, for example. When these images 44 and 46 are viewed with the left eye having a red filter and the right eye having a blue filter, respectively, the object G and the target point 21 can be viewed in stereo. It is obvious that the use the liquid crystal shutter method is preferable for the plotting step, but other means for viewing in stereo may be used. The selection of appropriate means according to a purpose of use makes it possible to observe the target point 21 more precisely.

When inputting condition parameters to obtain the image of FIG. 4 in the condition where the aerial photograph data obtained according to the photographing plan of FIG. 1 is stored, the input of the length and direction of each line segment serves also as the input of parameters to obtain a stereo image, for example. The midpoint of the line segment is placed at the virtual photographing position 22, and the line segment is placed at the reference plane height with the direction thereof being orthogonal to the view vector. The opposite ends 23 and 24 of the line segment are defined as virtual photographing positions, and the photographic principal point positions C2P5 and C3P6 close to these virtual photographing positions are selected. It is assumed that the spatial position information and the spatial direction of the view vector of the target point 21 input in this example are the same as those illustrated in FIG. 1.

Two aerial photographs having the selected two photographic principal point positions 23 and 24 are selected, and selected images are produced for the respective aerial photographs in the same manner as the first embodiment (as shown in FIG. 3). This procedure is repeated for each of the photographic principal point positions 23 and 24 to produce two selected images. The selected images are rectified as described above such that the two selected images match or substantially match with each other in the size of the image and the position of the target point, whereby the images 43 and 45 are obtained. The rectification means that a plurality of stereo images calculated by the use of epipolar geometry are converted to images in which their corresponding points are at the same height. The image conversion is performed by grid-fitting (or resampling) the image so as to fit the straight line connecting the corresponding points (corresponding to the epipolar line).

According to the method described above, a stereo image can be obtained easily by the use of the spatial position information of the target point, the spatial direction of the view vector, and the length and direction of the line segment. The stereo pairing step and the step of obtaining stereo pair information which are required by the prior arts can be omitted. This realizes a higher efficiency, and the labor and time for the plotting step can be reduced substantially.

Instead of the input of the length and direction of the line segment, a desired stereo feeling may be simply selected from among intense, medium, and weak feelings. In this case, the input procedure can be simplified even more. In order obtain a stereo image, it is generally believed that the relationship between a distance B between the actual photographing positions and a photographing altitude H is preferably such that B/H is from 0.5 to 0.9. When digital photographing is used, however, it is believed that B/H of up to about 0.3 is allowable.

Figure 6:
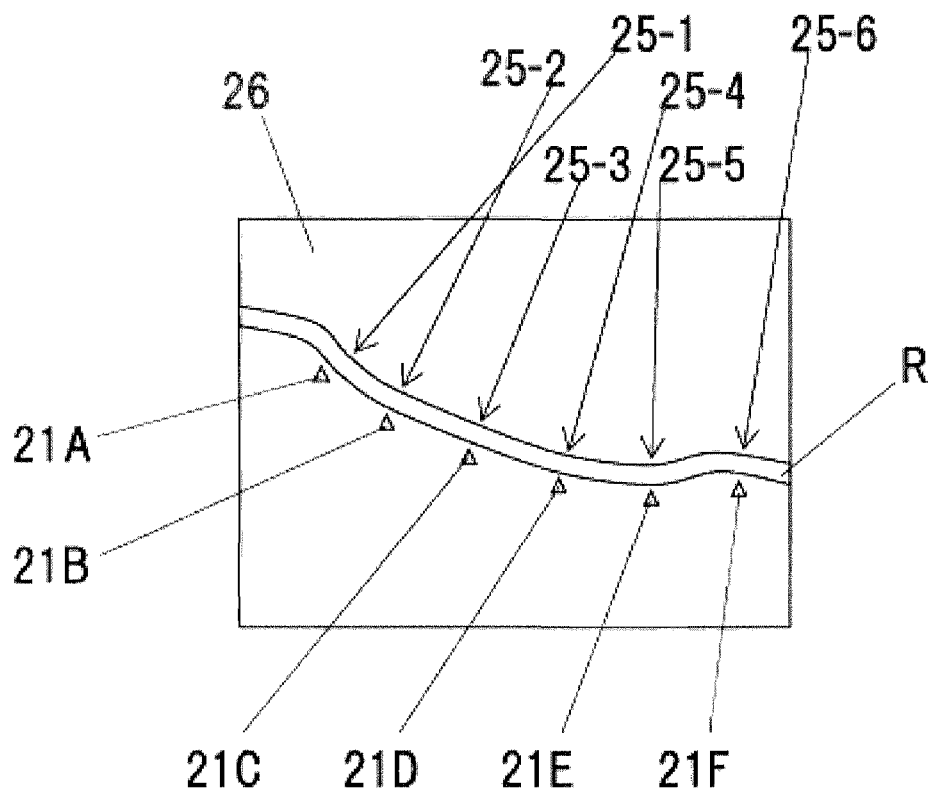
FIG. 6 illustrates another embodiment of the present invention.

FIG. 6 shows another embodiment of the present invention. The aerial photograph data obtained according to the photographing plan of FIG. 1 is used also in this embodiment. In FIG. 6, the image surrounded by the straight lines 1 and 6 and the straight lines 11 and 19 of FIG. 1 is shown in a conceptual diagram. A roadway denoted by R is shown to extend in the middle of FIG. 6. The data entry is performed by the user touching a light pen along the roadway. Subsequently, spatial position information of a target point 21-A is input. Further, a spatial direction 25-1 of the view vector is input.

As described in FIGS. 1 and 2, the virtual photographic principal point positions are then obtained. Further, target points 21-B to 21-F are automatically obtained along the roadway R by equidistant signals. Alternatively, if desired, several target points to be observed may be manually input. If a plurality of target points are input, a method not requiring continuity is employed. The spatial direction of the view vector is corrected with respect to the tangent line at the edge of the roadway that is located at a shortest distance from the target point to the roadway position. The spatial directions at the target points are thus corrected, and the spatial directions 25-2 to 25-6 are automatically determined. In case of the manual input as well, the spatial directions are automatically determined for the input target point inputs.

Figure 7:
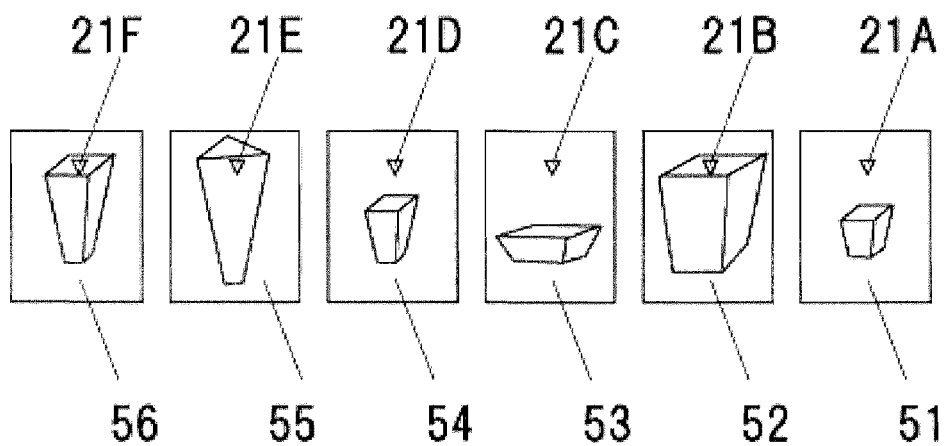
FIG. 7 is a conceptual diagram of a selected image obtained in FIG. 6.

As described in FIGS. 3 and 4, a selected image is similarly obtained for each of the target points. If the continuity is required, the selected images are determined such that the adjacent images partially overlap with each other to establish the continuity. FIG. 7 shows selected images 51 to 56 obtained by appropriately rotating the image thus obtained, corresponding to the target points 21A to 21F, respectively.

By displaying the selected images 51 and 55 thus obtained as shown in FIG. 7, the user is allowed to clearly see how is the view along the roadway. Alternatively, the selected images 51 and 55 may be flash-displayed successively one by one from the left to right or vice versa of FIG. 7, to show how the view looks like when the viewer moves along the roadway. In FIG. 6, the target points may be set on the opposite sides of the roadway R so that the both sides of the roadway R can be viewed. Alternatively, only necessary points on the opposite sides of the roadway R can be viewed by the manual input. When viewing the both sides of the roadway R as described above, the azimuth of the spatial direction of the view vector on one side of the roadway can be made opposite to that of the azimuth on the other side of the roadway. In FIG. 6, the azimuth of the view vector is in the direction from the opposite side of the roadway to the target point over the roadway. Thus, it will be easier to view from the position of the eye where the view vector is generated. In FIG. 7, therefore, the selected images 51 to 56 are arranged from the right to left. The selected images 51 to 56 are constructed such that these images partially overlap with each other at their adjacent portions. When the selected images 51 to 56 are arranged adjacent to each other or overlapped suitably with each other, a continuous image along the roadway can be obtained and thus the user is allowed to observe the view along the roadway clearly and precisely.

The present invention can be implemented by using commercially available programs or software. For example, the present invention can be implemented by combining image processing or image display software with calculation software and adding simple software thereto. The present invention thus provides advantageous effects such as simplifying the input procedure, and enabling obtaining a desired image from a desired direction with simple operation, and enabling obtaining accurate information. Furthermore, the present invention is applicable variously and is very useful.

Furthermore, the method of the present invention is able to utilize digitized aerial photograph analog data and aerial photographs digital data which are stored after photographing according to the prior art. The present invention thus has an advantage of being useful in utilization of the conventional data.

The invention claimed is:

1. A method of producing aerial photograph data comprising the steps of:
   determining a distance between a position of a virtual photographic principal point (virtual photographic principal point position) obtained by using spatial position information of a target point and a spatial direction of a view vector and a position of an actual photographic principal point (actual photographic principal point position) of each of a plurality of aerial photographs to automatically select a specific aerial photograph; and
   extracting, from the specific aerial photograph, a selected image having the target point arranged at a predetermined position in the selected image.

2. The method of producing aerial photograph data according to claim 1, wherein the spatial position information includes two-dimensional position information and altitude information of the target point, the spatial direction including a two-dimensional direction and a depression angle direction of the view vector, and the virtual photographic principal point position being obtained based on the altitude, the depression angle direction, and the height of a reference plane to photograph the aerial photograph.

3. The method of producing aerial photograph data according to claim 1, further comprising the step of: selecting a specific aerial photograph having the shortest distance between the virtual photographic principal point position and the actual photographic principal point position.

4. The method of producing aerial photograph data according to claim 1, wherein the target point is placed in the middle of the selected image.

5. The method of producing aerial photograph data according to claim 1, further comprising the steps of:
   defining the actual photographic principal point position (first actual photographic principal point position) of the specific aerial photograph (first specific aerial photograph) and a second actual photographic principal point position on a straight line or a substantially straight line specified on a horizontal plane or a substantially horizontal plane;
   selecting a second specific aerial photograph (second specific aerial photographs) having the second actual photographic principal point position; and
   extracting, in addition to the selected image (first selected image), a second selected image having the target point placed at the predetermined position in the second selected image from the second specific aerial photograph.

6. The method of producing aerial photograph data according to claim 5, further comprising a step of: inputting a direction and length of the straight line,
   wherein using the virtual photographing position that is obtained when a perpendicular line to the straight line is matched or substantially matched with the spatial direction at the midpoint of a line segment having the input length, one end of the straight line is used to select the first actual photographic principal point position while the other end of the straight line is used to select the second actual photographic principal point position, based on the length of the line segment.

7. The method of producing aerial photograph data according to claim 1, further comprising an acquisition step in which distances are compared between actual photographic principal point positions of the plurality of aerial photographs and a virtual photographic principal point position (second virtual photographic principal point position) that is different from the virtual photographic principal point position (first virtual photographic principal point position) and is obtained based on a spatial direction (second spatial direction) that is the same as or different from the spatial direction (first spatial direction) and spatial position information of a target point (second target point) that is different from the target point (first target point) to automatically select a second specific aerial photograph having the second actual photographic principal point position, and in addition to the first selected image a second selected image including the second target point is extracted from the second specific aerial photograph,
   wherein, when the second target point is defined or the size of the second selected image and the arrangement of the images are determined such that the first selected image is partially overlapped with the second selected image, and the first selected image and the second selected image are arranged in parallel adjacent to or close to each other, the spatial direction of the first target point in the first selected image becomes parallel or substantially parallel with the spatial direction of the second target point in the second selected image, and the first selected image and the second selected image hold the continuity with each other.

8. The method of producing aerial photograph data according to claim 7, comprising successive steps of repeating the acquisition step for third and subsequent specific aerial photographs of third and subsequent actual photographic principal point positions obtained based on third and subsequent target points and third and subsequent virtual photographic principal point positions to produce third and subsequent selected images including the third and subsequent target points.

9. A method of producing aerial photograph data from a plurality of selected images arranged in a sequence corresponding to the sequence of photographing, the selected images, the method comprising:
   a step of determining a distance between a position of a virtual photographic principal point (virtual photographic principal point position) obtained using spatial position information of a target point and a spatial direction of a view vector and a position of an actual photographic principal point (actual photographic principal point position) of each of a plurality of aerial photographs to automatically select a specific aerial photograph;

a step of extracting, from the specific aerial photograph, a selected image having the target point arranged at a predetermined position therein;

an acquisition step in which, distances between actual photographic principal point positions of the plurality of aerial photographs and a virtual photographic principal point position (second virtual photographic principal point position) that is different from the virtual photographic principal point position (first virtual photographic principal point position) and is obtained based on a spatial direction (second spatial direction) that is the same as or different from the spatial direction (first spatial direction) and spatial position information of a target point (second target point) that is different from the target point (first target point) to automatically select a second specific aerial photograph having the second actual photographic principal point position, and in addition to the first selected image a second selected image including the second target point is extracted from the second specific aerial photograph such that, when the second target point is defined or the size of the second selected image and the arrangement of the images are determined such that the first selected image is partially overlapped with the second selected image, and the first selected image and the second selected image are arranged in parallel adjacent to or close to each other, the spatial direction of the first target point in the first selected image becomes parallel or substantially parallel with the second spatial direction of the target point in the second selected image, and the first selected image and the second selected image hold the continuity with each other; and successive steps of repeating the acquisition step for third and subsequent specific aerial photographs of third and subsequent actual photographic principal point positions obtained based on third and subsequent target points and third and subsequent virtual photographic principal point positions to produce third and subsequent selected images including the third and subsequent target points.

10. A method of producing aerial photographic data in an aerial photograph data set based on a first and a second selected image, wherein the aerial photograph data of the first selected image and aerial photograph data of the second selected image are combined to produce a stereo data set, said method comprising:

a step of determining a distance between a position of a virtual photographic principal point (virtual photographic principal point position) obtained by using spatial position information of a target point and a spatial directions of a view vector and a position of an actual photographic principal point (actual photographic principal point position) of each of a plurality of aerial photographs to automatically select a first specific aerial photograph;

a step of extracting, from the first specific aerial photograph, a selected image having the target point arranged at a predetermined position therein;

a step of selecting a second specific aerial photograph (second specific aerial photograph) including the actual photographic principal point position of the first specific aerial photograph (first actual photographic principal point position) and having a second actual photographic principal point position located on a straight line or substantially straight line specified on a horizontal plane, and extracting a second selected image having the target point arranged at the predetermined position in the second selected image from the second specific aerial photograph; and a step of inputting a direction and length of the straight line, wherein using the virtual photographing position that is obtained when a perpendicular line to the straight line is matched or substantially matched with the spatial direction at the midpoint of a line segment having the input length, one end of the straight line is used to select the first actual photographic principal point position while the other end of the straight line is used to select the second actual photographic principal point position, based on the length of the line segment.

* * * * *